United States Patent [19]

Bucher

[11] 4,360,951
[45] Nov. 30, 1982

[54] CASTER WITH BRAKING MECHANISM

[75] Inventor: Peter Bucher, Pfäffikon, Switzerland

[73] Assignee: Heinrich Bucher, Fallanden, Switzerland

[21] Appl. No.: 174,615

[22] Filed: Aug. 1, 1980

[30] Foreign Application Priority Data

Aug. 3, 1979 [CH] Switzerland ............... 7172/79

[51] Int. Cl.³ ............................................. B60B 33/00
[52] U.S. Cl. ................................. 16/35 R; 188/1.12; 188/29; 280/33.99 C
[58] Field of Search ............... 188/1.12, 10, 19, 20, 188/21, 22, 29, 74, 2 F, 265; 16/35 R, 35 D; 280/33.99 C; 182/17

[56] References Cited

U.S. PATENT DOCUMENTS

| 1,532,644 | 4/1925 | Bastien | 188/10 X |
| 2,684,734 | 7/1954 | Wilson | 188/74 |
| 2,685,351 | 8/1954 | Kramesak, Jr. | 16/35 R |
| 3,534,978 | 10/1970 | Stanfield | 188/1.12 X |
| 3,800,916 | 4/1974 | Kellberg et al. | 188/29 X |
| 4,114,232 | 9/1978 | Umeda | 188/1.12 X |
| 4,205,413 | 6/1980 | Collignon et al. | 16/35 D |
| 4,276,962 | 7/1981 | Aulik | 188/29 X |

FOREIGN PATENT DOCUMENTS

| 1338643 | 11/1973 | United Kingdom | 188/29 |
| 1377155 | 12/1974 | United Kingdom | 188/1.12 |

Primary Examiner—George E. A. Halvosa

[57] ABSTRACT

A wheel is rotatably journalled in a supporting fork which is swivable about a substantially vertical axis. A disc is freely mounted over the wheel in a manner to straddle the fork substantially concentric with the vertical axis. The disc is provided with a brake shoe, centrally of its lower surface, in opposition to the surface of the wheel and the disc is movable, by a lever, operated by a pedal or manual assembly, into contact with the wheel.

5 Claims, 4 Drawing Figures

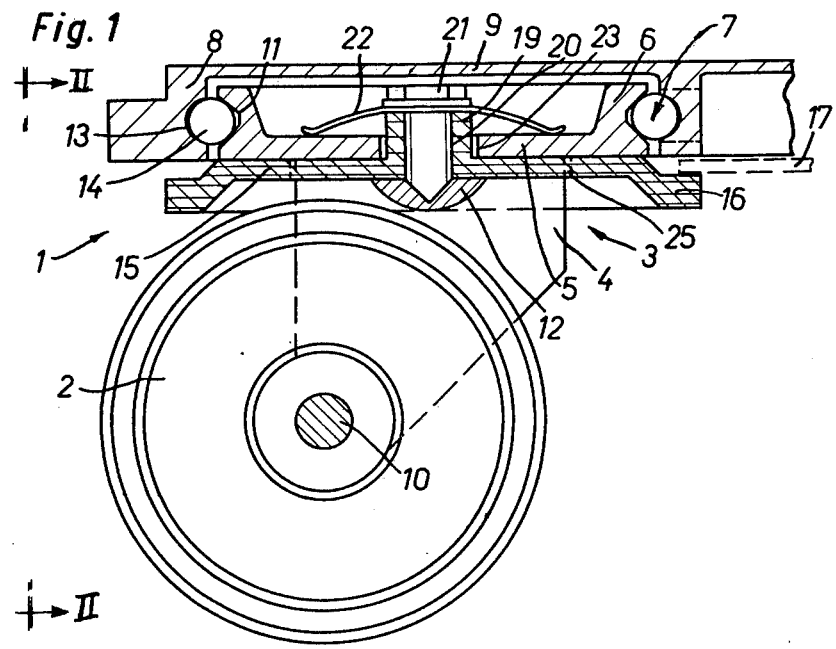
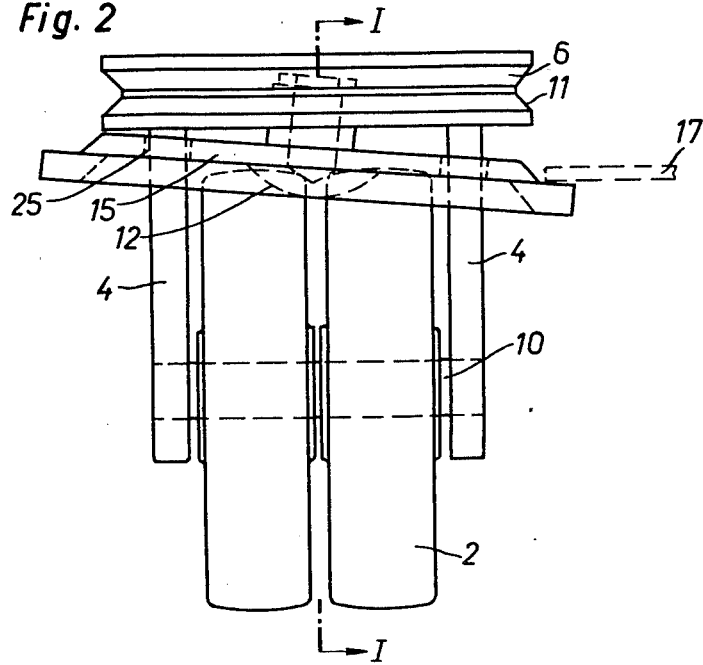

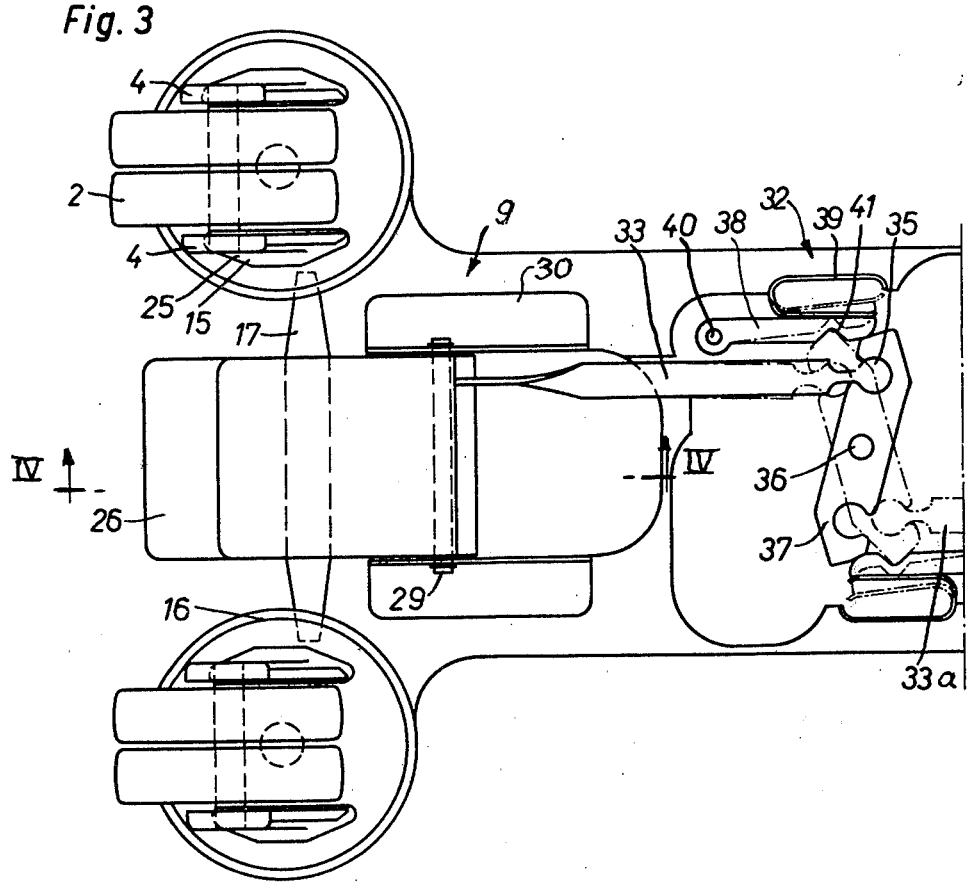
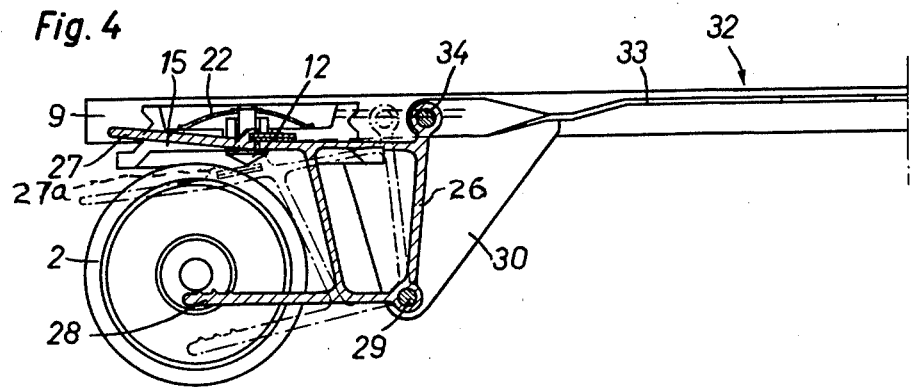

CASTER WITH BRAKING MECHANISM

BACKGROUND OF THE INVENTION

The present invention relates to a brakeable caster particularly adapted for use on the chassis of a movable container such as a cart or trolley.

Movable containers such as food carts used on aircraft, ships, and railways, as well as containers used in the transport of materials in factories, warehouses, hospitals and the like are well known. In general, such carts are usually provided with four casters to insure easy maneuverability. In many instances, it is also necessary to provide a brake mechanism which can be used to stop the cart randomly in its travel. It is advantageous to have the brake mechanism able to lock the casters against rolling, as well as against swiveling.

A commonly known caster comprises a wheel journalled on an axle fixed in the opposing arms of a supporting swivel fork. In order that the brake mechanism for such casters, engage the wheel in all its positions, it was necessary to arrange the brake member or brake shoe so that it engages the surface of the wheel within the arms of the supporting fork. For this purpose, it has been known to provide the supporting fork with a hollow pivot, about which it swivels, and to concentrically and displaceably mount the brake member or shoe on a guide rod extending within the hollow pivot. To operate the brake member or shoe, a lifting mechanism is provided having a connecting link guide and a rotary lever. However, this construction is relatively complicated and costly and requires a large amount of space particularly in the axial direction of the pivot. As a result, much space is lost within the cart in the area at the bottom of the cart wherein the caster is mounted and the brake mechanism are provided.

It is an object of the present invention to provide a brakeable caster which overcomes the foregoing difficulties and which is simple in construction, saving of space, and permits effective locking of the wheel as well as of the swiveling supporting fork.

SUMMARY OF THE PRESENT INVENTION

In accordance with the present invention a brakeable caster is provided comprising a wheel member rotatably journalled in a supporting fork swivable about a substantially vertical axis. A brake disc is freely mounted over the wheel, straddling the fork substantially concentric with the vertical axis. The brake disc is provided with a brake shoe, centrally of its lower surface, in opposition to the surface of the wheel and the disc is movable, by a lever, operated by a pedal or manual assembly, into contact with the wheel.

Preferably, the disc is mounted between the wheel member and the cross plate of a U-shaped supporting fork, so that on its movement, into brake position it not only engages the wheel but is tilted relative to the axis to engage the cross plate thereby cimultaneously braking the fork against swivelling.

Full details of the present invention are set forth in the following description and illustrated in the accompanying drawings.

BRIEF DESCRIPTION OF THE DRAWINGS

In the drawings:

FIG. 1 is a vertical section of the caster of the present invention taken along line I—I of FIG. 2;

FIG. 2 is the end view of the caster of the present invention taken along line II—II of FIG. 1;

FIG. 3 is a plan view of the rear portion of the base structure of a cart (with the superstructure removed) showing the application of the present invention; and FIG. 4 is a sectional view taken along lines IV—IV of FIG. 3.

DESCRIPTION OF THE INVENTION

The caster generally depicted by the numeral 1 as seen in FIG. 1, comprises a wheel 2 formed of pair rollers conjointly rotatably journalled in a swivellable supporting fork 3. The fork is formed of a pair of vertical arms 4 interconnected at their upper ends by a cross plate 5 which is integrally formed with a vertically upstanding annular flange which forms the inner race ring 6 of a combined axial/radial bearing generally depicted by the numeral 7. The bearing is provided with an outer race ring 8 integrally formed on the base 9 of the cart, which is not otherwise illustrated. The term "cart" as used herein is intended to designate any type of container for receiving materials such as foods, work pieces, and other items. Such a cart can have racks, shelves, drawers, or may be formed with only a single cavity.

The race surface 11 of the inner race ring 6 is conical in cross section while the race surface 13 of the outer race ring 8 is circular. Lodged between the race surfaces 11 and 13 are a plurality of bearing balls 14, completing the axial/radial bearing. Of course, it is possible for the races of the bearing, generally depicted by the numeral 7, to be formed separate from the base 9 and/or the caster 1; that is the inner and outer races 6 and 8 can be separately formed and later attached with suitable conventional fasteners to the base and/or caster respectively.

The wheel 2 can be constructed as paired rollers, as shown clearly in FIGS. 1 and 2 or as a single roller member with a correspondingly larger width. The use of a double roller, however, is preferred in combination with the braking system to be later described. The wheel (i.e., rollers), is preferably mounted by suitable bearings to be freely rotatable upon a fixed axle 10 which axle is secured in the opposing fork arms 4. On the other hand, the wheels may be fixed on the axle which in turn is journalled in the fork arms for free rotation.

The brake assembly of the present invention comprises a brake shoe 12 which is integrally fixed to the lower surface of an enlarged disc 15 which is arranged between the cross-plate 5 and the wheel 2. The brake shoe 12 and the disc 15 can be made in one piece, that is from a molded plastic material although a two-piece construction is also suitable, as for example if the brake shoe is formed on the end of a central hub on which the disc is secured. The brake shoe 12 and the disc 15 should be sufficiently strong to withstand excessive force during braking and the brake shoe 12 should have a sufficiently high frictional quality relative to the material of the wheel to act in the capacity of a brake.

The disc 15 has a diameter which is greater than that of the cross plate 5 and straddles the fork arms 4. A peripheral flanged edge 16, offset downwardly from the upper edge of the disc 15 is provided, the flanged edge being adapted to be engaged by a lever 17 seen in FIGS. 1 and 2 in dotted form. The brake disc 15 is formed with an upwardly extending cylindrical hub 19 positioned concentrically with respect to the axis of rotation of the bearing 7. The hub 19 is provided with a tapped hole 20 which receives a cap screw 21, which is used to fix a leaf spring 22 to the hub 19. The ends of the leaf spring extend arcuately downward against the top surface of the cross plate 5, which is made with an enlarged central bore 23 through which the hub 19 fits. In this manner, the spring 22 acts to resiliently bias the disc 15 against the bottom surface of the plate 5 but allows the disc 15 to tilt or tip relative to the central axis, as shown in FIG. 2. The diameter of the upper surface of the disc 15 is substantially equal to that of the cross plate 5 so that under the bias and force of the spring 22 the disc 15 will rotate conjointly with the cross plate 5 about the central axis defined by the axis of rotation of the bearing. The disc 15 is provided with axial cutouts 25 through which the fork arms 4 extend. These cutouts 25 have a width larger than that of the fork arms 4 so that the disc 15 can tilt, relative to the vertical axis.

In operation, the caster is braked by actuating the brake lever 17 downwardly against the flange 16 so as to tilt the disc 15. The upper surface of the disc 15, as seen in FIG. 2, thus engages the lower edge of the cross plate 5 in a skewed manner while simultaneously causing the brake shoe 12 to move in an arcuate downward manner to engage the wheel 2. Because of the central location of the brake shoe 12, it engages the wheel 2 in that portion between the paired rollers thus making firm contact centrally of the wheel. Due to the downward pressure exerted by the lever 17 and the engagement of the disc 15 with the cross plate 5 at the opposite end, the compressive force is reinforced and the reaction of the brake shoe 12 with the wheel 2 causes not only the braking of the wheel 2 but also the locking of the supporting fork relative to the base 9. Thus, the rolling motion as well as the swivelling motion of the caster are effectively braked.

In FIGS. 3 and 4 the use of the caster shown in FIGS. 1 and 2 with a system for operating the brake lever 17 on a chassis having four casters is illustrated. The chassis is shown only having two casters, although the fact that it will be constructed with four casters should be evident.

The brake lever 17 is mounted to extend across the width of the chassis into proximity with each of the casters, on an assembly comprising a rectangular frame 26 having rearwardly extending pedals 27 and 28 at its upper and lower edges respectively. The frame 26 is pivotly mounted about a shaft 29 journalled at each end in a wall 30 depending from the base 9 of the cart. The lever 17 is held on the upper pedal 27 by a pair of opposed hook-like members 27a integrally formed with the upper pedal 27. The lever 17 may be otherwise screwed, welded or in other conventional manner be secured to the frame 26. By depression of the pedal 28, the lever 17 is forced downwardly as seen in the dotted position of FIG. 4 so that the two casters between which it extends, are simultaneously braked. Pushing upwardly on the upper pedal 27 causes the lever 17 to return upwardly thus releasing the braking action. Of course, the return to the unlocked or released position is aided by the leaf spring 22 which normally biases the operating disc 15 upwardly against the cross plate 5.

To permit the operator of the cart freedom of individual movement, it is helpful to provide means for affixing the pedal assembly in both its braking position and in its released position. To this end, a link assembly generally depicted by the numeral 32 is provided. This link assembly, can also serve the function of connecting the remaining casters of the cart (not shown) to the pedal structure so that they may be locked or released simultaneously. The link assembly 32 comprises a connecting rod 33 pivotally connected at one end 34 to the upper inner edge of the rectangular frame 26 of the pedal assembly. The opposite end 35 of the rod 33 is formed of a circular cross section, or in ball shape and fits into a conforming recess in a double lever 37 pivotable about a central axis 36. The end 35 and its conforming recess form a poppit, ball or universal connection. The opposite end of the double lever 37 is provided with a recess of similar construction, but facing in the opposite direction and is adapted to engage with a second rod 33a, connected to the pedal mechanism of the not shown forward casters, so that its movement can be connected to a similar pedal assembly on which a corresponding lever 17 is mounted.

The terminal ends of the double lever 37 are angularly shaped so that they will cooperate with a latch 38 which is freely pivotable about a pin 40 at one end. The latch 38 is provided with a cutout 41 adapted to receive the angular ends of the lever 37. A spring 39 acts against the latch 38, resiliently maintaining the latch against the surface of the double lever 37. In this manner positive engagement of the double lever 37 takes place in both the cutout 41 and in reaction with the free ends of the latch 38 so as to "lock" the lever in both an "engaged" and disengaged position. The spring force 39 is sufficient to hold the double lever 37 in either its engaged or disengaged position and in either position of the pedal assembly but is not so strong as to prevent movement of the double lever 37 on actuation of either pedal 28 or 27.

By means of the link assembly 32 it is thus possible to lock or release all four casters of the cart from one end of the cart by the single pedal assembly. On the other hand, by providing a pedal assembly at the forward end of the cart as well as at the rear end of the cart, operation of the brake system can be effected from either end of the cart. While a pedal assembly actuable by foot operation is shown, it is clear that the pedal assembly can be connected to a suitable linkage extending upwardly of the cart so that it can be operated manually, that is by hand.

From the foregoing, it will be clear that the braking system of the present invention is relatively simple and space saving in that most of the parts are housed within the recess of the base 9. The circular brake disc 15 in particular permits a simple construction of the caster assembly and avoids complex construction of the parts thereof.

Various modifications and changes are suggested herein, others will be obvious to those skilled in the present art. Accordingly, the present disclosure is to be taken as illustrative of the invention and not as limiting thereof.

What is claimed is:

1. A brakeable caster for the chasis of a cart, chair or the like comprising a wheel member rotatably journalled in a supporting fork swivable about a substantially vertical axis, said supporting fork comprising a cross plate having a circular periphery forming the inner race of a radial/axial bearing having an outer race formed on said chasis, and a pair of depending arms to which said wheel member is journalled, said cross plate having an opening concentric with the vertical axis, a disc freely mounted over and straddling said supporting fork between said cross plate and said wheel member, said disc having a central hub freely extending through the central opening in said cross plate, spring means bearing on said hub and the surface of said cross plate, opposite said disc for normally biasing said disc out of contact with said wheel member, a brake shoe secured to said hub in opposition to said wheel member, said disc being provided with a peripheral flange offset downwardly from the central portion thereof, and a lever adapted to act on said flange for moving said disc with respect to the vertical axis to cause said brake shoe to engage said wheel member.

2. The caster according to claim 1, wherein said lever is positioned relative to said disc to simultaneously move said disc and brake shoe into contact with said wheel and tilt said disc into contact with said plate.

3. A cart comprising a chasis having a base and at least one pair of casters according to claim 1 or 2, having a common lever extending into engagement with said paired casters and means for operating said lever to brake said casters simultaneously.

4. The cart, according to claim 3, wherein said means for operating said lever includes a linkage for selectively locking and unlocking said lever and means for resiliently maintaining said lever in locked or unlocked condition.

5. The cart, according to claim 4, wherein said means for resiliently maintaining said lever comprises a locking lever, a latch engageable with said lever and spring means biasing said latch, said latch having means for engaging said locking lever in locked and unlocked condition.

* * * * *